(12) United States Patent
Ishioka et al.

(10) Patent No.: US 11,882,789 B2
(45) Date of Patent: Jan. 30, 2024

(54) MOWER MOUNTED ON A WORK VEHICLE HAVING SUSPENSION ARMS

(71) Applicant: ISEKI & CO., LTD., Ehime-ken (JP)

(72) Inventors: Narutoshi Ishioka, Ehime-ken (JP); Hirotaka Toda, Ehime-ken (JP)

(73) Assignee: ISEKI & CO., LTD., Ehime-ken (JP)

( * ) Notice: Subject to any disclaimer, the term of this patent is extended or adjusted under 35 U.S.C. 154(b) by 513 days.

(21) Appl. No.: 17/076,123

(22) Filed: Oct. 21, 2020

(65) Prior Publication Data

US 2021/0251138 A1    Aug. 19, 2021

(51) Int. Cl.
  *A01D 34/74* (2006.01)
  *A01D 34/64* (2006.01)
  *A01D 67/00* (2006.01)
  *A01D 101/00* (2006.01)

(52) U.S. Cl.
  CPC ............. *A01D 34/74* (2013.01); *A01D 34/64* (2013.01); *A01D 67/005* (2013.01); *A01D 2101/00* (2013.01)

(58) Field of Classification Search
  CPC ...... A01D 34/661; A01D 34/64; A01D 34/74; A01D 67/005; A01D 2101/00
  See application file for complete search history.

(56) References Cited

U.S. PATENT DOCUMENTS

| | | | | |
|---|---|---|---|---|
| 5,367,861 A * | 11/1994 | Murakawa | ............. | A01D 34/64 56/15.8 |
| 5,816,033 A * | 10/1998 | Busboom | ............... | A01D 34/74 56/121.46 |
| 2008/0190087 A1* | 8/2008 | Elhardt | .................. | A01D 34/74 56/17.1 |
| 2015/0000238 A1* | 1/2015 | Matsugi | ............... | A01D 34/661 56/16.7 |
| 2015/0121832 A1* | 5/2015 | Nier | ....................... | A01D 34/74 56/320.1 |
| 2015/0296711 A1* | 10/2015 | Haun | ..................... | A01B 63/12 56/10.1 |
| 2021/0144915 A1* | 5/2021 | Tsuduki | ................. | A01D 34/64 |

FOREIGN PATENT DOCUMENTS

| | | | | |
|---|---|---|---|---|
| EP | 2077067 A1 * | 7/2009 | ............. | A01D 34/74 |
| EP | 2193983 A2 * | 6/2010 | ............. | A01D 34/81 |
| EP | 3219969 A1 * | 9/2017 | ............. | A01D 34/008 |
| JP | 2006271294 A * | 10/2006 | | |
| JP | 2012-178983 A | 9/2012 | | |
| WO | WO-2018179584 A1 * | 10/2018 | ............. | A01D 41/12 |

* cited by examiner

*Primary Examiner* — Alicia Torres
(74) *Attorney, Agent, or Firm* — Finnegan, Henderson, Farabow, Garrett & Dunner LLP

(57) ABSTRACT

A work vehicle includes a running vehicle body, a floor forming a bottom portion of an operation part of the running vehicle body, a fuel tank arranged below the floor, a lawn mower suspended from a lower part of the running vehicle body, a front suspension arm for suspending a front portion of the lawn mower, and a rear suspension arm for suspending a rear portion of the lawn mower. The rear suspension arm is arranged to avoid the fuel tank.

6 Claims, 9 Drawing Sheets

MOWER MOUNTED ON A WORK VEHICLE HAVING SUSPENSION ARMS

CROSS REFERENCE TO RELATED APPLICATIONS

This application claims priority to Japanese Patent Application No. 2020-022115, filed Feb. 13, 2020, the disclosure of which is incorporated herein by reference in its entirety.

BACKGROUND

The invention relates to a work vehicle such as a riding (e.g., ride-on) lawn mower.

As a riding lawn mower including a lawn mower below a running vehicle body having a driver's seat, there is known a mid-mower type riding lawn mower in which a lawn mower is suspended between front and rear wheels by a link mechanism (e.g., see JP-A-2012-178983).

SUMMARY

However, in the configuration of the above conventional riding lawn mower, a fuel tank of an engine was arranged above the engine, but an exhaust gas treatment device is arranged above the engine due to exhaust gas regulations. So, there was no space above the engine. For this reason, it was required to place the fuel tank below the floor.

Some embodiments of the present disclosure may aim to address issues encountered in conventional riding lawn mowers. An object of an embodiment may be to provide a compact work vehicle in which the lawn mower can be sufficiently lifted, in light of investigations and developments on the arrangement of the fuel tank.

A first aspect of the disclosure may include a work vehicle that includes a running vehicle body, a floor forming a bottom portion of an operation part of the running vehicle body, a fuel tank arranged below the floor, a lawn mower suspended from a lower part of the running vehicle body, a front suspension arm for suspending a front portion of the lawn mower, and a rear suspension arm for suspending a rear portion of the lawn mower. The rear suspension arm may be arranged to avoid the fuel tank.

In addition to the configuration of the first aspect, a second aspect may have a configuration that the rear suspension arm has a suspension arm bracket that is fixed to a lower portion of the running vehicle body and protrudes outward from the lower portion in a left and right direction, and a rear suspension arm body that has an L shape in a plan view and that has one end pivotably attached to a tip of the suspension arm bracket and the other end pivotably connected to the rear portion of the lawn mower, and a pivot fulcrum at the tip of the suspension arm bracket is located outside an outer surface of the fuel tank in the left and right direction, and a pivot fulcrum at a connection portion of the rear suspension arm body on the rear portion of the lawn mower is located inside the outer surface of the fuel tank in the left and right direction.

In addition to the configuration of the first aspect, a third aspect may have a configuration that the rear suspension arm is provided on the left and right, respectively, and one end of each of relay arms is pivotably connected to each of extensions of the left and right rear suspension arms further extending rearward at a suspension connection portion of the rear portion of the lawn mower, one end of each of lift arms is pivotably connected to the other end of each of the left and right relay arms, and the other end side of each of the left and right lift arms is pivotably connected to each of left and right rear wheel axle members of the running vehicle body, a stop member for stopping the pivoting of the one lift arm at a predetermined position is attached to the one rear wheel axle member, a lifting cylinder for driving the pivoting of the other lift arm is attached to the other rear wheel axle member, the lawn mower is lifted and lowered by pivoting the other lift arm by the lifting cylinder, and the height of the lawn mower is adjusted by stopping the pivoting of the one lift arm at a predetermined position by the stop member.

In addition to the configuration of the third aspect, a fourth aspect may have a configuration that the stop member is pivotable, and the predetermined position of the pivoting of the one lift arm is changed according to the pivot position, an adjustment member for adjusting the pivot position of the stop member is provided below a dashboard cover that covers a meter panel in front of the operation part, and the stop member and the adjustment member are connected by a wire.

In addition to the configuration of the first aspect, a fifth aspect may have a configuration that the rear suspension arm is provided on the left and right, respectively, and one of the rear suspension arms is arranged to avoid the fuel tank, and the other of the rear suspension arms is arranged to avoid an oil filter attached to a lower portion of the running vehicle body.

According to the first aspect, the suspension arm can be provided to avoid the fuel tank while arranging the fuel tank at the lower portion of the vehicle. Therefore, the lawn mower can be compactly configured.

According to the second aspect, the suspension arm can be arranged to avoid the fuel tank provided at the lower portion of the vehicle. Therefore, the lawn mower can be compactly configured.

According to the third aspect, the stop member is provide on one of the left and right lift arms, and the lifting cylinder is provided on the other of the left and right lift arms. Therefore, the members can be arranged without waste, and the lawn mower can be compactly configured.

According to the fourth aspect, a driver can easily operate the stop member in the operation part.

According to the fifth aspect, one of the suspension arms can be arranged to avoid the fuel tank, and the other of the suspension arms can be arranged to avoid the oil filter. Therefore, the lawn mower can be compactly configured.

DESCRIPTION OF EMBODIMENTS

Figure 1:
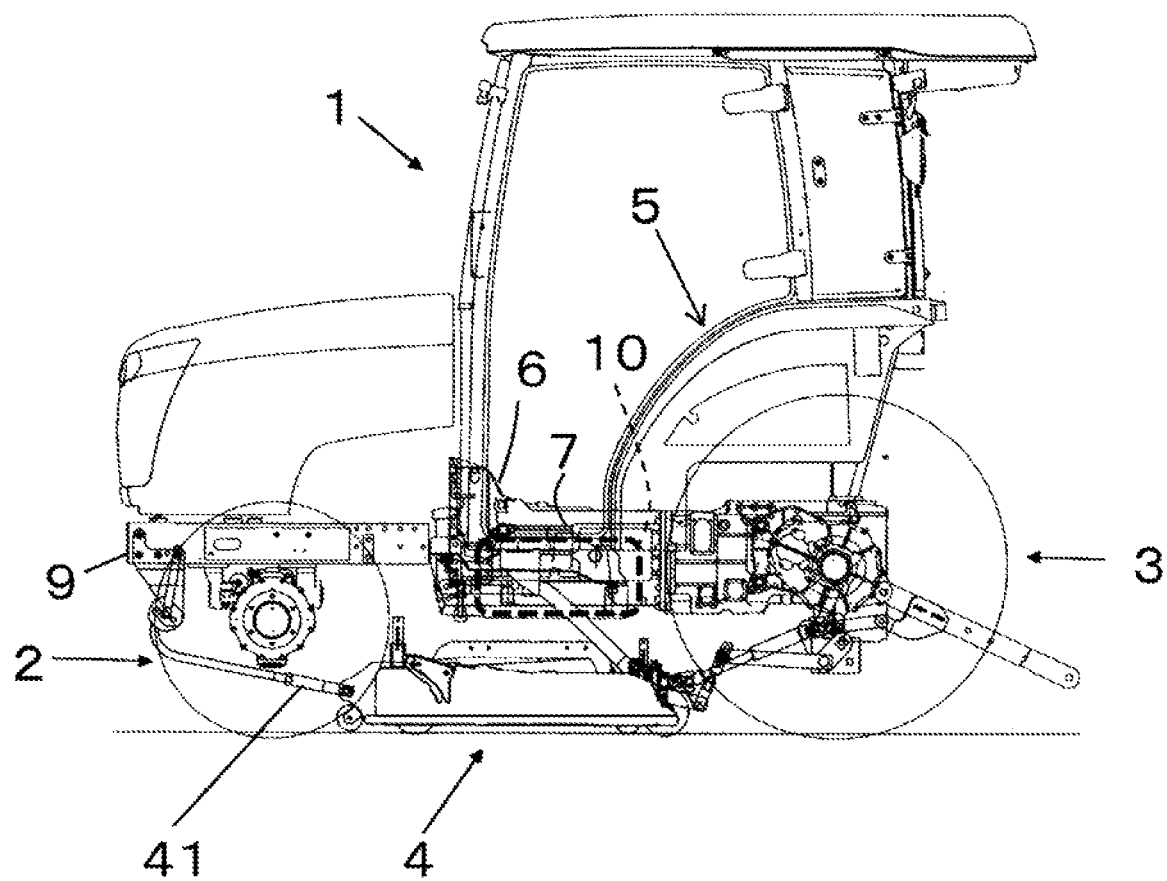
FIG. 1 is a left side view of a work vehicle according to an embodiment.
Figure 2:
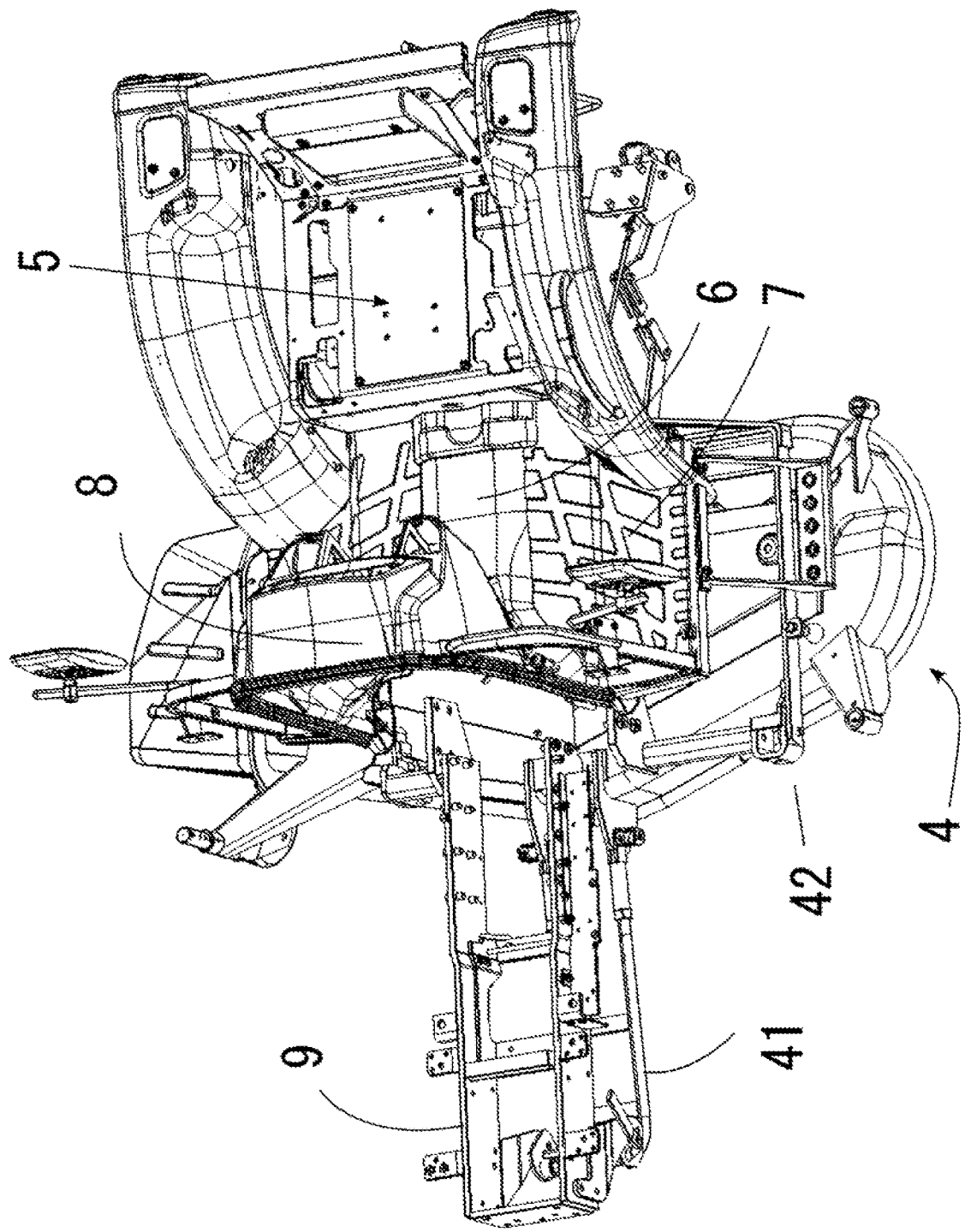
FIG. 2 is a perspective view centering on an operation part of the work vehicle.

Hereinafter, an embodiment of the invention will be described in detail with reference to the drawings. FIG. 1 is a left side view of a work vehicle according to an embodiment, and FIGS. 2 to 8 are views showing a part of a riding lawn mower that may be an example of a work vehicle. Here, directional references such as the front and rear and the left and right are based on the running direction of the work vehicle. The work vehicle may be configured to travel in the running direction, and a vehicle body of the work vehicle may be configured based on the running direction. A longitudinal direction may correspond to a front and rear direction with respect to the vehicle body. A horizontal (e.g., lateral) direction may correspond to a left and right direction of the vehicle body. A vertical direction may correspond to an upper and lower direction of the vehicle body. The longitudinal, horizontal, and vertical directions may be perpendicular to one another. The longitudinal and horizontal directions may be parallel to a ground surface. A plan view of the work vehicle may be in a plane formed by the longitudinal and horizontal directions.

In FIGS. 1 to 8, a reference character 1 represents a vehicle body (e.g., a running vehicle body) of the riding lawn mower of the present embodiment, 2 represents front wheels, 3 represents rear wheels, 4 represents a mower (e.g., a mid-mower type lawn mower suspended from a lower part of the running vehicle body 1), 5 represents an operation part, 6 represents a transmission case, and 7 represents a floor.

An engine fuel tank 10 is mounted below the floor 7. Further, an oil filter 11 is also arranged beside the fuel tank 10.

Figure 3:
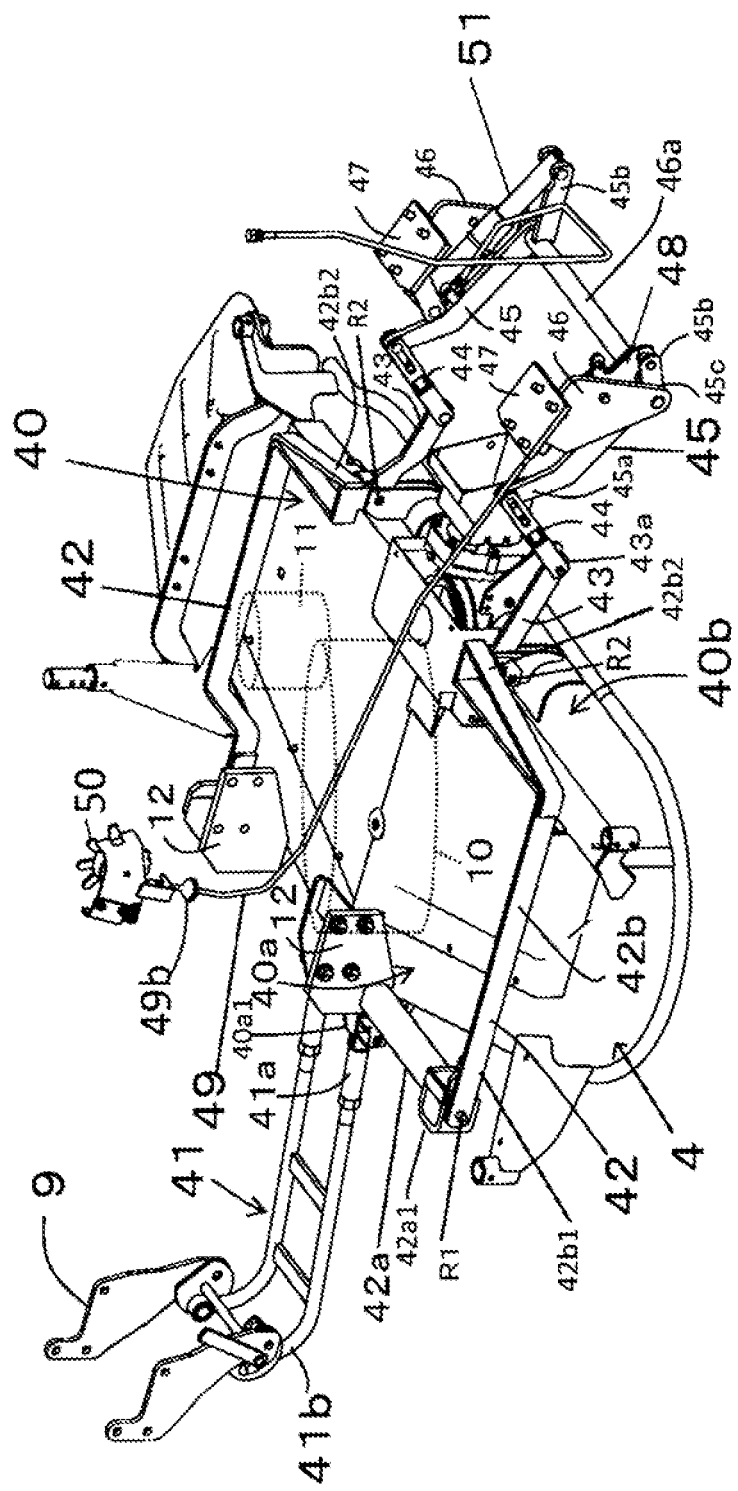
FIG. 3 is a perspective view centering on a lawn mower of the work vehicle.
Figure 4:
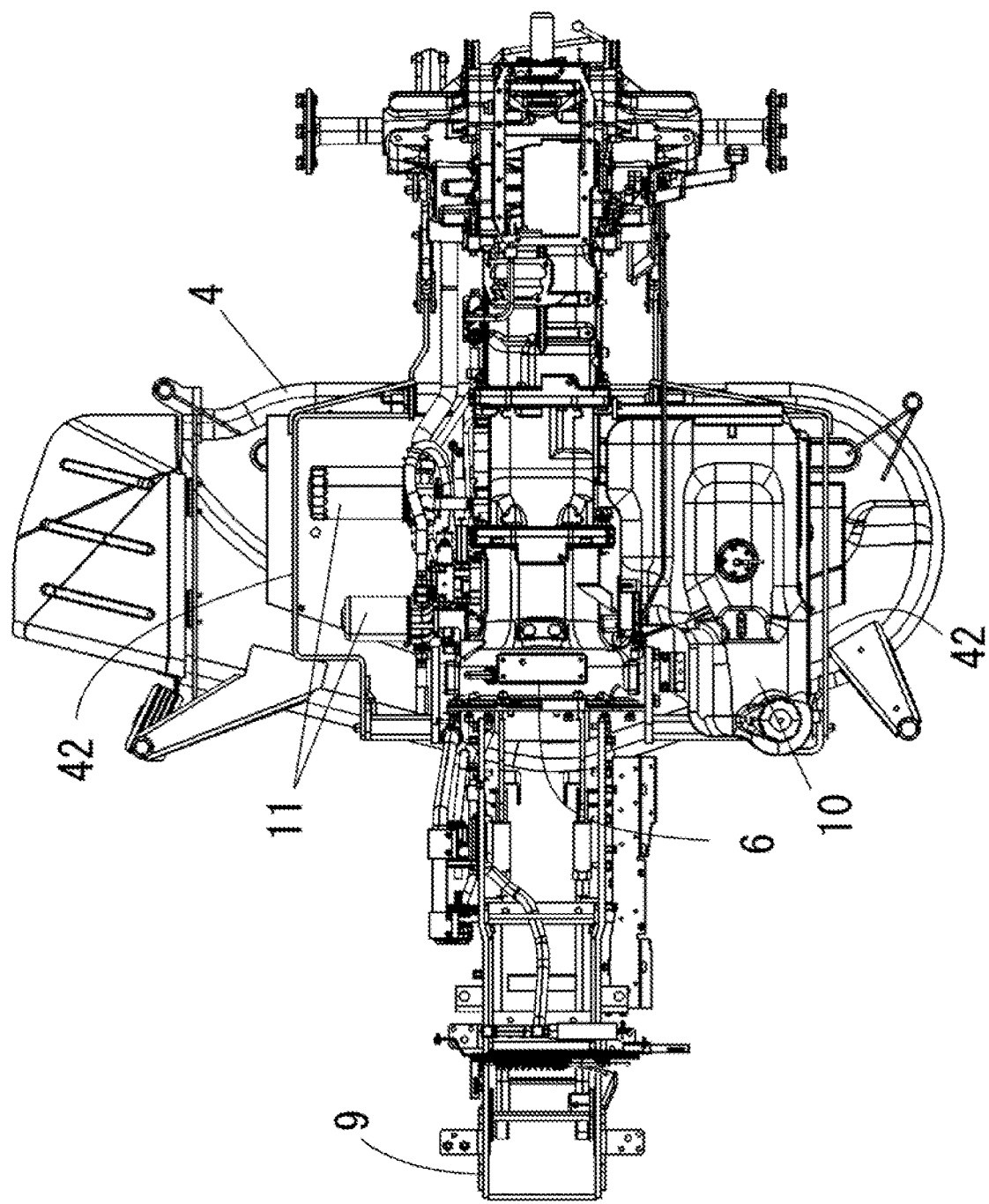
FIG. 4 is a plan view of the lawn mower.
Figure 5:
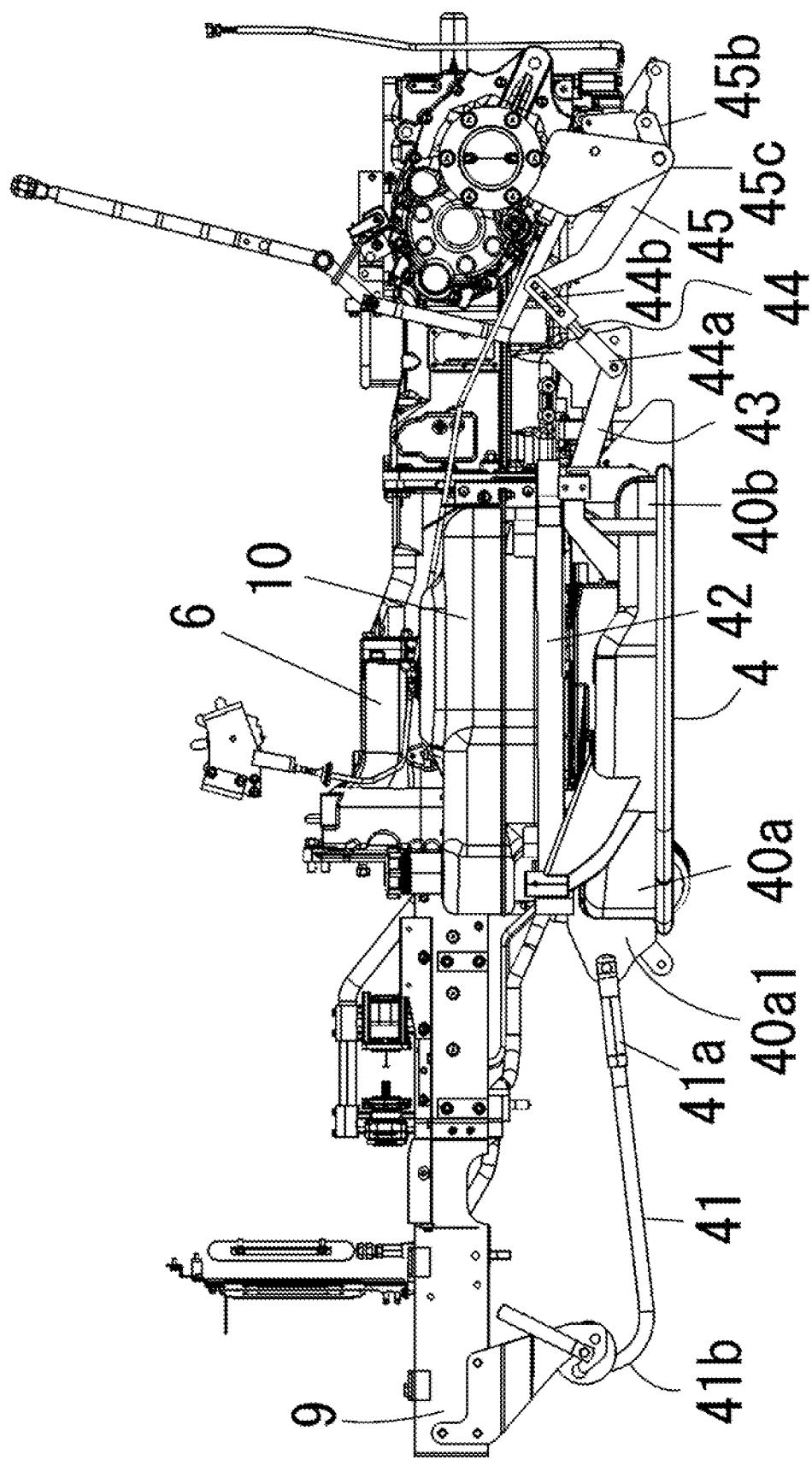
FIG. 5 is a left side view of the lawn mower.
Figure 6:
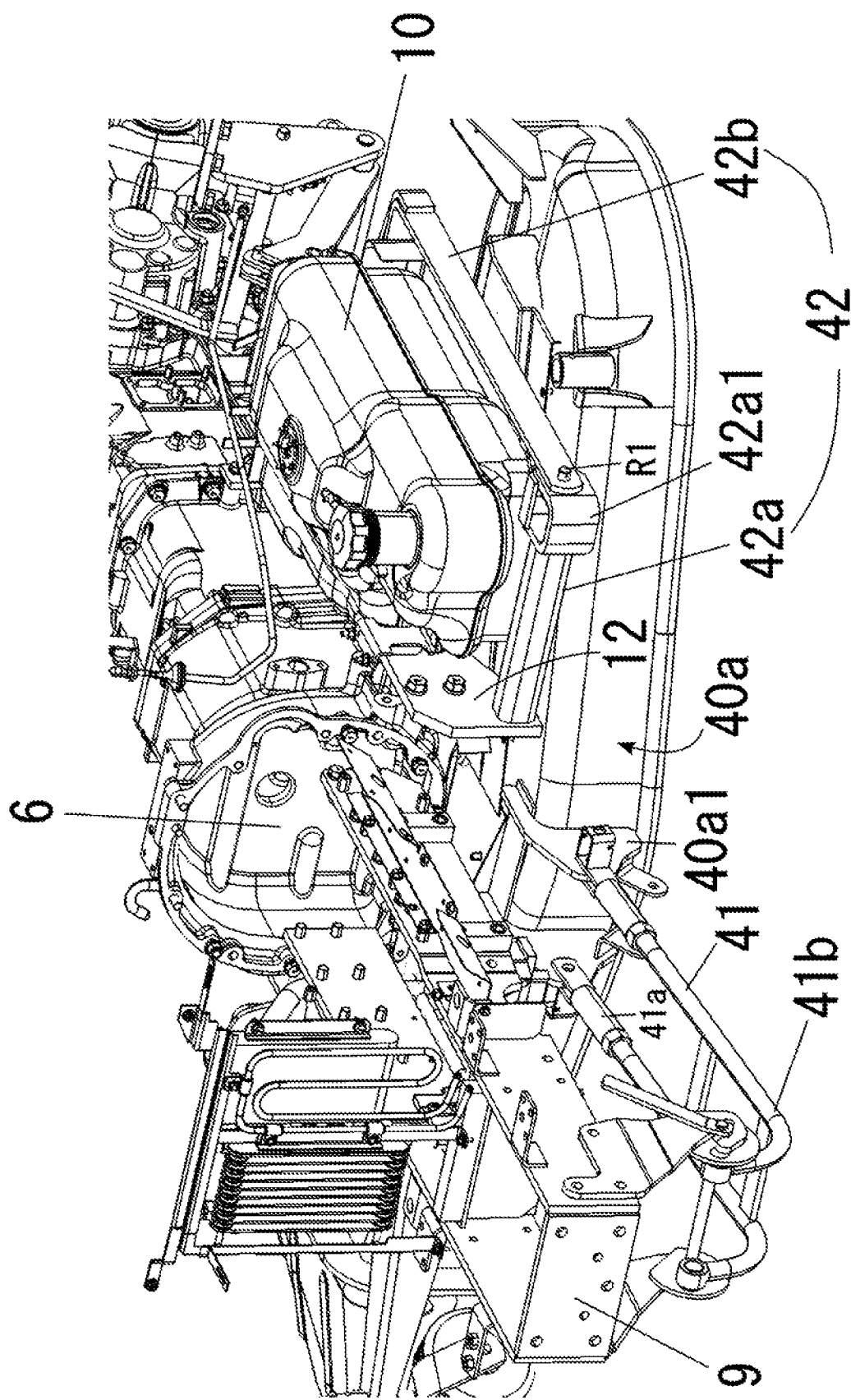
FIG. 6 is a partial perspective view of the lawn mower as seen from the front and upper.

As shown in FIG. 3 and the like, the lawn mower 4 has a deck 40 with a blade (not shown) mounted on the inner lower surface.

A front suspension arm 41 may be configured to support (e.g., suspend) a front portion 40a of the of the deck 40 of the mower 4. For example, the rear end 41a of the front suspension arm 41 is pivotably connected to a front bracket 40a1 fixed to the front portion 40a of the deck 40. The front suspension arm 41 may be a ladder type front suspension arm. On the other hand, a front end 41b of the front suspension arm 41 is pivotably connected to a front frame 9 of the running vehicle body 1. Therefore, the front portion 40a of the deck 40 is pivotably suspended from a lower portion of the running vehicle body 1 and can be moved up and down.

A rear suspension arm 42 may be configured to support (e.g., suspend) a rear portion 40b of the of the deck 40 of the mower 4. For example, two mounting plates 12, 12 are fixed to the left and right positions of the transmission case 6 of the running vehicle body 1, respectively. Further, a suspension arm bracket 42a is fixed to the left mounting plate 12 so as to protrude outward in the left direction with reference to the left and right direction. Furthermore, a front end 42b1 of a rear suspension arm body 42b is pivotably connected to a tip 42a1 of the suspension arm bracket 42a. A reference character R1 represents a pivot fulcrum (front pivot fulcrum). The suspension arm bracket 42a and the rear suspension arm body 42b constitute (e.g., are included in) the rear suspension arm 42.

The rear suspension arm body 42b is bent to form an L shape in a plan view. A rear end 42b2 of the rear suspension arm body 42b is pivotably connected to a rear portion 40b of the deck 40. A reference character R2 represents a pivot fulcrum (rear pivot fulcrum) that is an example of a connecting portion. A frame forming the rear end 42b2 has a triangular shape and is reinforced.

As a result, the rear suspension arm 42 may avoid the fuel tank 10, and there is no concern that the rear suspension arm 42 interferes with the fuel tank 10, even when the lawn mower 4 is sufficiently lifted closer to the floor 7. Configuration of the rear suspension arm 42 may include the arrangement of the rear suspension arm 42 in the work vehicle. The rear suspension arm 42 may be offset from the fuel tank 10 in a horizontal direction of the running vehicle body 1.

The rear end 42b2 of the rear suspension arm body 42b is further extended rearward (e.g., in the longitudinal direction of the running vehicle body 1) to form an extension 43. A lower end 44a of a relay arm 44 is pivotably connected to a rear end 43a of the extension 43.

Furthermore, a front end 45a of a lift arm 45 is pivotably connected to an upper end 44b of the relay arm 44. Further, a rear end 45b of the lift arm 45 has a shape that is slightly curved upward. Moreover, a lowermost end 45c of the lift arm 45 is pivotably connected to a bracket 46. The bracket 46 is fixed to a lower surface of a rear wheel axle member 47.

Figure 7:
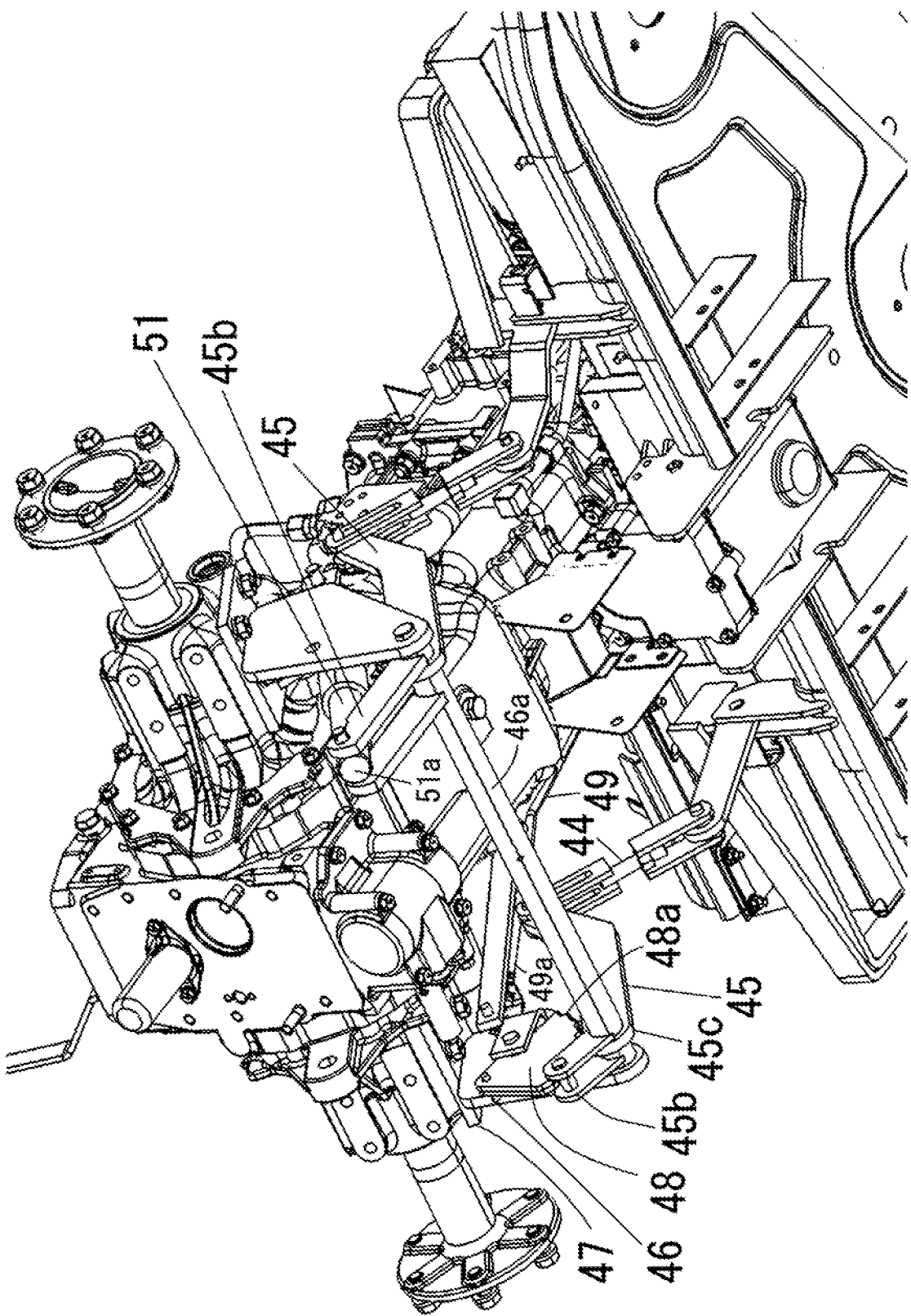
FIG. 7 is a partial perspective view of the lawn mower as seen from the rear and lower side.

Further, as shown in FIG. 7, a cam 48 is pivotably attached to the bracket 46. An eccentric tooth-shaped uneven part 48a is formed on one edge of the cam 48. The uneven part 48a may include grooves, protruding parts, or concavities, etc. When the rear end 45b of the lift arm 45 approaches the tooth-shaped uneven part 48a, the rear end 45b is hooked thereon. The cam 48 is an example of a stop member.

Furthermore, a rear end 49a of a wire 49 is connected to a part of the cam 48. A front end 49b of the wire 49 is connected to an adjustment member 50 provided below a dashboard cover 8 that covers a meter panel in front of the operation part 5. The position of the eccentric tooth-shaped uneven part 48a of the cam 48 is changed by operating the wire 49, and the height of the lawn mower 4 can be adjusted as described later. Further, since the wire 49 is used, the arranging is facilitated. That is, the wire 49 is arranged below the floor 7, on the outside of the transmission case 6, and above the fuel tank 10.

Figure 8:
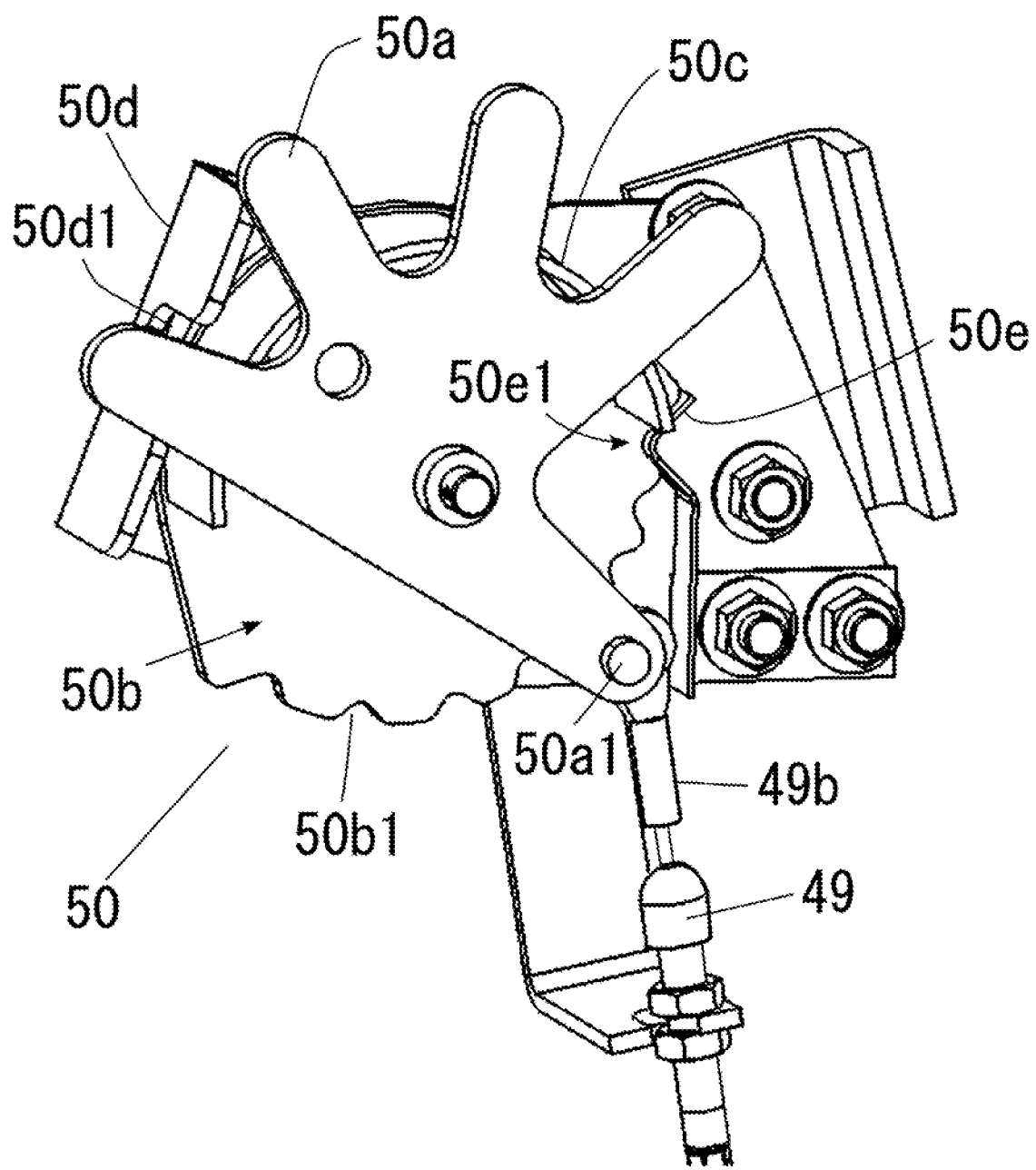
FIG. 8 is a right side view of an adjustment member of the lawn mower.
Figure 9:
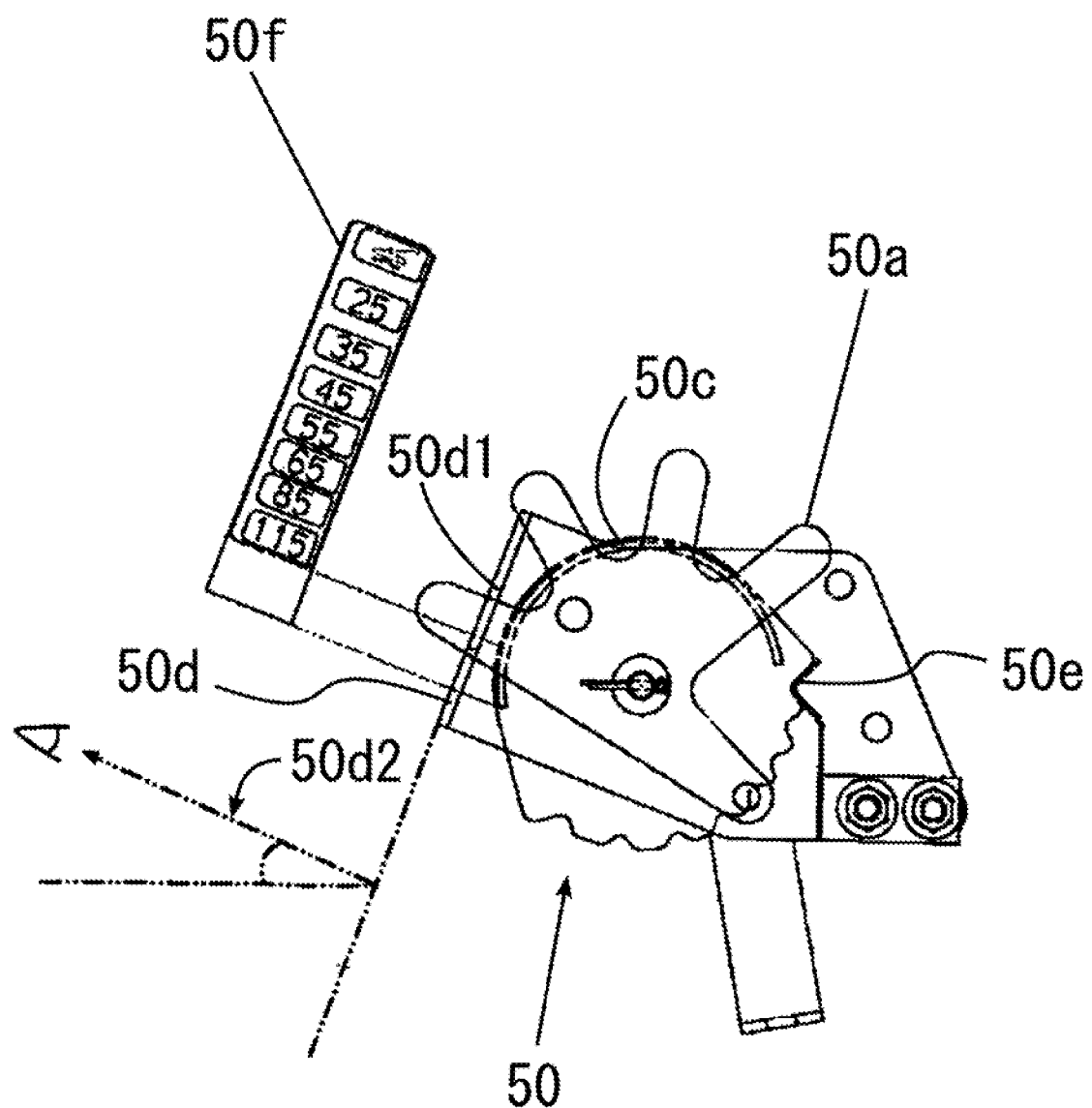
FIG. 9 is an explanatory view of the adjustment member.

The adjustment member 50 has a grip portion 50a pivotably connected to the dashboard cover 8 and having a plurality of protrusions, as shown in FIGS. 8 and 9. Therefore, an operator (e.g., a driver) can easily grasp the grip portion 50a from the driver's seat. Further, the shape of the plurality of protrusions is a rod shape with a round tip so that a driver's finger is easily caught. The front end 49b of the wire 49 is connected to a lower end 50a1 of the grip portion 50a. Further, a substantially circular cam member 50b integrally fixed to the grip portion 50a is provided. Furthermore, a semi-cylindrical member 50c is fixed to the cam member 50b along substantially an upper half of the circular shape. A label 50f is attached to the front side of the semi-cylindrical member 50c, as shown in FIG. 9. The label 50f has a numerical value indicating the cutting height.

On the other hand, a display board 50d having a display notch 50d1 formed thereon is fixed to the dashboard cover 8. The cam 48 can be pivoted via the wire 49 by pivoting the grip portion 50a. However, at that time, a curved portion 50e1 of a leaf spring lock member 50e fixed to the dashboard cover 8 is fitted to a tooth-shaped uneven part of the cam member 50b to temporarily lock the cam member 50b and the grip portion 50a.

Simultaneously, a cutting height label display corresponding to the pivoted position is visible from the notch 50d1 of the display board 50d. The position, size, and the like of the notch 50d1 are designed so as to correspond in that way. For example, parameters of the notch 50d1 may be configured such that the visible pivoted position of the label 50f attached to the front side of the semi-cylindrical member 50c corresponds to cutting height. Furthermore, since the orientation and inclination of the display board 50d to be mounted are set at an angle (50d2) facing a driver, a driver can easily see the numerical value of the cutting height from the notch 50d1. The adjustment member 50 is arranged between a tilt steering and a brake rod or a clutch pedal. The reason for such an arrangement may be that a driver's hand is easy to reach and easy to operate the adjustment member 50.

Subsequently, the right rear suspension arm 42 will be described. The structure of the right rear suspension arm 42 is substantially the same as that of the left rear suspension arm 42. A difference may include that the right rear suspension arm 42 is bent so as to avoid the oil filter 11. Therefore, the lawn mower 4 can be lifted to the vicinity of the floor 7.

Furthermore, the right rear suspension arm 42 is also similar to the left rear suspension arm 42 in that the extension 43, the relay arm 44, and the lift arm 45 are provided on the rear side. Here, a tip of a lifting cylinder 51 is pivotably connected to the rear end 45b of the right lift arm 45. A bottom of the lifting cylinder 51 is pivotably connected to the right bracket 46 that is erected on a lower surface of the right rear wheel axle member 47.

Therefore, the right lift arm 45 can be forcibly pivoted by expanding and contracting a rod 51a of the lifting cylinder 51. Thereby, it is possible to raise the lawn mower 4, as will be described later. Since the installation direction of the lifting cylinder 51 and the right lift arm 45 are arranged in parallel as shown in FIG. 3, it is possible to facilitate assembly and save space by using a sub-assembly. Further, since the lifting cylinder 51 has a rear link structure, the lifting cylinder 51 can be removed at the same time just by removing a rear link. Furthermore, when the above-described eccentric cam 48 is also configured as a rear link, the lifting cylinder 51 and the cam 48 can be simultaneously removed by removing the rear link. A reference character 46a represents a link that connects the left and right brackets 46, 46.

Subsequently, an operation of the work vehicle of the present embodiment will be described.

First, the operation of raising the lawn mower 4 will be described. The rod 51a of the lifting cylinder 51 is extended by hydraulic pressure or gas pressure. Therefore, the rear end 45b of the right lift arm 45 is forced to pivot downward. As a result, the right lift arm 45 is pivoted in the clockwise direction with the right bracket 46 as a pivot fulcrum. As a result, the right relay arm 44 connected to the right lift arm 45 is lifted upward. Then, the right extension 43 connected to the right relay arm 44 is lifted. As a result, the rear end 42b2 of the right rear suspension arm 42 integrated with the extension 43 is also lifted. Simultaneously, since the rear end 42b2 is connected to the rear portion 40b of the deck 40, the rear portion 40b of the deck 40 is also lifted.

On the other hand, since the front end of the right rear suspension arm 42 is pivotably connected to the mounting plate 12, the deck 40 is lifted while moving slightly backward. In this case, the rear suspension arm 42, the extension 43, the relay arm 44, and the lift arm 45 on the left side also have the same structure, and the front suspension arm 41 is also connected to the deck 40. These members form a parallel link structure. Therefore, in accordance with the movement of the right side of the deck 40, the left side of the deck 40 is also forcibly lifted while keeping the horizontal state. In this case, since the cam 48 on the left side is provided at a position where it does not interfere with the movement of the left lift arm 45, the cam 48 does not affect the lifting procedure.

In this way, even when the deck 40 is lifted and reaches near the floor 7, the left rear suspension arm 42 can be sufficiently lifted without concern of interference because the left rear suspension arm 42 is arranged to be bent with respect to the fuel tank 10 so as to avoid the fuel tank 10.

On the other hand, since the right rear suspension arm 42 is also arranged to be bent with respect to the oil filter 11 so as to avoid the oil filter 11, the right rear suspension arm 42 can be sufficiently lifted without concern of interference.

Subsequently, the operation of lowering the deck 40 that has been lifted in this way and the height adjustment at that time will be described.

First, a driver operates the adjustment member 50 below the dashboard cover 8 in a state of sitting down. As shown in FIG. 8 and FIG. 9, a driver looks at the numerical value through the notch 50d1 of the display board 50d and checks whether or not the cutting height is set to a target numerical value. When the target numerical value is not seen through the notch 50d1, the grip portion 50a is turned forward or backward. Accordingly, the cam member 50b and the semi-cylindrical member 50c are turned. As a result, the label 50f on the semi-cylindrical member 50c is pivoted, and the numerical value is exchanged. Then, when the target numerical value is displayed through the notch 50d1, the turning is stopped at that time. Further, at that position, the curved portion 50e1 of the leaf spring lock member 50e is fitted to the tooth-shaped unevenness of the cam member 50b to temporarily lock the cam member 50b and the grip portion 50a.

In this way, when the adjustment member 50 is operated, the wire 49 connected to the adjustment member 50 also moves. As a result, the eccentric cam 48 connected to the wire 49 is also pivoted accordingly.

In such a state, the hydraulic pressure or gas pressure of the lifting cylinder 51 is released. As a result, the deck 40 supported by the right lift arm 45 is lowered while maintaining the horizontal state due to its weight.

As a result, the left rear suspension arm 42 starts to pivot in the clockwise direction, and accordingly, the left extension 43 also starts to pivot in the clockwise direction. The left relay arm 44 connected to the extension 43 is pulled down, and at the same time, the front end 45a of the left lift arm 45 is pulled down. As a result, the rear end 45b of the left lift arm 45 starts to pivot in the counterclockwise direction. As a result, depending on the position of the above-described eccentric cam 48, the rear end 45b bites onto the tooth-shaped unevenness 48a, and the lifting of the rear end 45b of the lift arm 45 in the counterclockwise direction is stopped.

In this way, the movements of the lift arm 45, the relay arm 44, and the extension 43 on the left side are also stopped, and the deck 40 cannot be further lowered at that position.

In this way, the deck 40 is adjusted to the height adjusted by the adjustment member 50.

Embodiments of the disclosure may realize a compact riding lawn mower in which the fuel tank can be arranged below the floor and the lawn mower can be lifted so as to approach the floor. This is useful for a work vehicle.

LIST OF REFERENCE CHARACTERS

1 Running vehicle body
2 Front wheel
3 Rear wheel
4 Lawn mower
40 Deck
41 Front suspension arm
42 Rear suspension arm 43 Extension
44 Relay arm
45 Lift arm
46 Bracket
47 Rear wheel axle member
48 Cam (stop member)
49 Wire
5 Operation part
6 Transmission case
7 Floor
8 Dashboard cover
9 Front frame of running vehicle body
10 Fuel tank
11 Oil filter
12 Mounting plate
50 Adjustment member
51 Lifting cylinder

What is claimed is:

1. A work vehicle comprising:
a vehicle body;
a floor forming a bottom portion of an operation part of the vehicle body;
a fuel tank arranged below the floor;
a mower suspended from a lower part of the vehicle body;
a front suspension arm configured to support a front portion of the mower; and
a rear suspension arm configured to support a rear portion of the mower,
wherein the rear suspension arm is configured to avoid the fuel tank,
the rear suspension arm includes a left rear suspension arm provided on a left side of the vehicle body in a horizontal direction and a right rear suspension arm provided on a right side of the vehicle body in the horizontal direction,
a left relay arm and a right relay arm is pivotably connected at a first end thereof to each of extensions of the left and right rear suspension arms further extending rearward at a suspension connection portion of the rear portion of the mower,
a left lift arm and a right lift arm is pivotably connected to a second end of each of the left and right relay arms at a first end of the left and right lift arms,
the left and right lift arms are pivotably connected at a second end thereof to each of left and right rear wheel axle members of the vehicle body,
a stop member configured to stop pivoting of one lift arm at a predetermined position is attached to one rear wheel axle member,
a lifting cylinder configured to drive pivoting of the other lift arm is attached to the other rear wheel axle member, the lifting cylinder being configured to lift and lower the mower by pivoting the other lift arm, and
the stop member is configured to adjust height of the mower by stopping pivoting of the one lift arm at the predetermined position.

2. The work vehicle according to claim 1, wherein the rear suspension arm is offset from the fuel tank in a horizontal direction of the vehicle body.

3. The work vehicle according to claim 1, wherein the rear suspension arm includes a suspension arm bracket that is fixed to a lower portion of the vehicle body and protrudes outward from the lower portion in a horizontal direction, and a rear suspension arm body that has an L shape in a plan view and that has one end pivotably attached to a tip of the suspension arm bracket and the other end pivotably connected to the rear portion of the mower, and
a pivot fulcrum at the tip of the suspension arm bracket is located outside an outer surface of the fuel tank in the horizontal direction, and a pivot fulcrum at a connection portion of the rear suspension arm body on the rear portion of the mower is located inside the outer surface of the fuel tank in the horizontal direction.

4. The work vehicle according to claim 1, wherein
the stop member is pivotable,
the predetermined position of pivoting of the one lift arm is changed according to a pivot position,
an adjustment member configured to adjust the pivot position of the stop member is provided below a dashboard cover, and
the stop member and the adjustment member are connected by a wire.

5. The work vehicle according to claim 1, wherein the rear suspension arm includes a left rear suspension arm provided on a left side of the vehicle body in a horizontal direction and a right rear suspension arm provided on a right side of the vehicle body in the horizontal direction,
one of the left and right rear suspension arms is arranged to avoid the fuel tank, and
the other of the left and right rear suspension arms is arranged to avoid an oil filter attached to a lower portion of the vehicle body.

6. The work vehicle according to claim 1, wherein the stop member includes a cam having an eccentric tooth-shaped uneven part formed on an edge of the cam.

* * * * *